United States Patent [19]

Horter et al.

[11] 4,364,278

[45] Dec. 21, 1982

[54] ASSEMBLY FOR MONITORING TORSIONAL LOADING OF A DRIVE SHAFT

[75] Inventors: Hans-Dieter Horter, Friedrichshafen; Wolfgang Maier, Markdorf; Herbert Seibold, Mariabrunn, all of Fed. Rep. of Germany

[73] Assignee: Zahnradfabrik Friedrichshafen Aktiengesellschaft, Friedrichshafen, Fed. Rep. of Germany

[21] Appl. No.: 191,022

[22] Filed: Sep. 26, 1980

[30] Foreign Application Priority Data

Sep. 29, 1979 [DE] Fed. Rep. of Germany ....... 2939566

[51] Int. Cl.³ .............................................. G01L 3/10
[52] U.S. Cl. .................................. 73/862.36; 324/209
[58] Field of Search .............. 73/DIG. 2, 779, 862.36, 73/862.33, 862.69, 862.28; 324/209

[56] References Cited

U.S. PATENT DOCUMENTS

| | | | |
|---|---|---|---|
| 2,365,073 | 12/1944 | Haight | 73/862.36 |
| 3,340,729 | 9/1967 | Scoppe | 73/862.33 |
| 3,465,581 | 9/1969 | Hohenberg | 73/862.36 |
| 3,861,206 | 1/1975 | Kawafune et al. | 73/862.36 X |
| 4,100,794 | 7/1978 | Meixner | 73/862.28 |

FOREIGN PATENT DOCUMENTS 1115051 10/1961 Fed. Rep. of Germany ... 73/DIG. 3
657281 4/1979 U.S.S.R. ............................ 73/862.36

OTHER PUBLICATIONS

Siemens article, vol. 7, Aug. 1954, pp. 299–302.

*Primary Examiner*—Charles A. Ruehl
*Attorney, Agent, or Firm*—Karl F. Ross

[57] ABSTRACT

An assembly for monitoring torsional loading of a drive shaft comprises a magnetic-field generator juxtaposed to a cylindrical body of magnetostrictive material rigidly surrounding the shaft, the body being in the form of a thin foil attached to the shaft via a layer of magnetically insulating material, or a sleeve attached to the shaft by at least two spaced brackets or an outer layer of the shaft specially treated to have a homogeneous magnetic permeability in an unstressed state. A pick-up or magnetic-field sensor is juxtaposed to the body or sheath for detecting differential changes in the magnetic permeability thereof, the pick-up advantageously being connected to a demodulator which extracts a signal whose polarity is determined by the direction of loading of the shaft. In order to monitor the rotation rate of the shaft, the foil or sleeve is provided with a longitudinal slot and the demodulator is connected at its output to a low-pass filter and a high-pass filter which extract a torsion-dependent signal and a rotation-rate-dependent signal, respectively.

14 Claims, 25 Drawing Figures

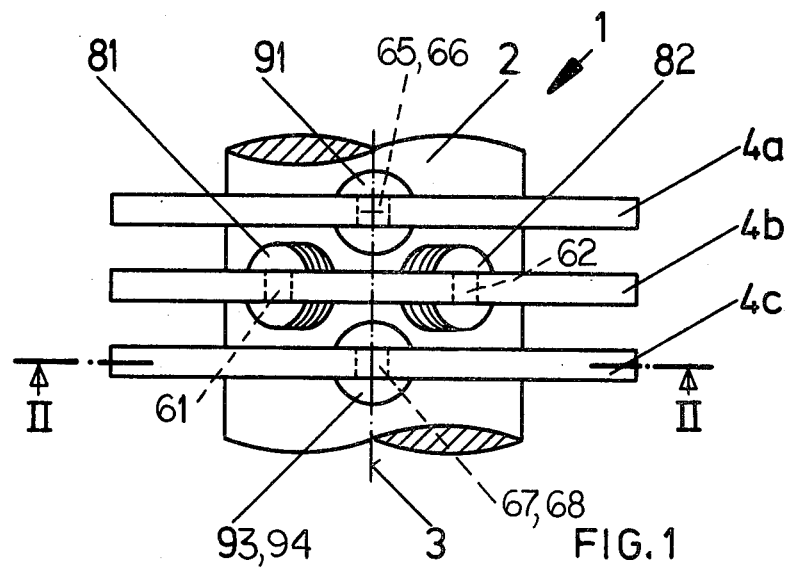
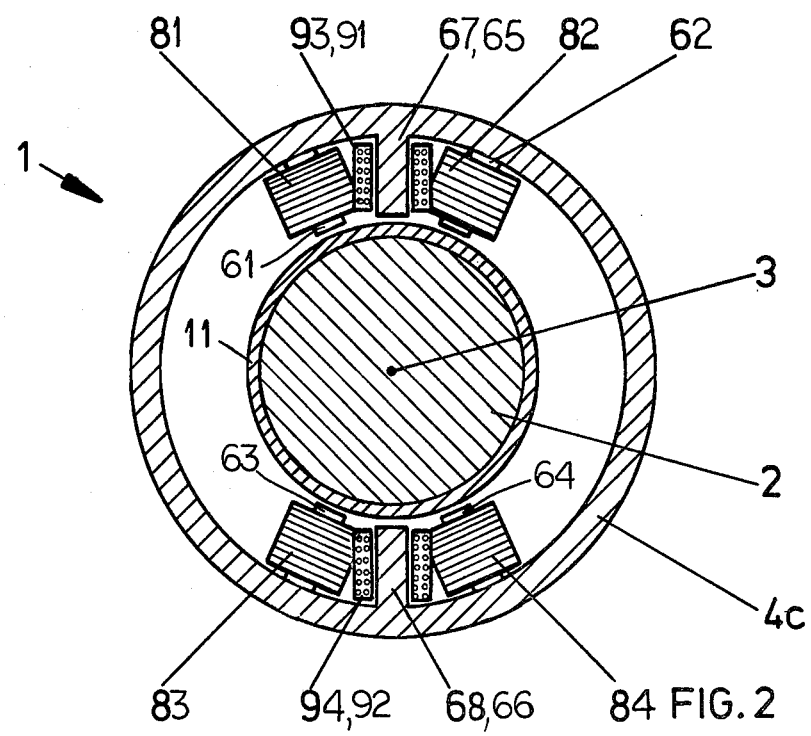

ASSEMBLY FOR MONITORING TORSIONAL LOADING OF A DRIVE SHAFT

FIELD OF THE INVENTION

Our present invention relates to an assembly for monitoring the torsional loading of a drive shaft. More particularly, our present invention relates to an electromagnetic shaft-torsion monitor responsive to magnetostrictive effects induced upon the loading of a drive shaft.

BACKGROUND OF THE INVENTION

It is known to provide an apparatus for monitoring torsional loading of a drive shaft by utilizing magnetostrictive effects induced therein includes a stationary ring surrounding the shaft and carrying a multiplicity of inwardly radially oriented pole pieces having respective energizing coils, the coils being fed, for example, from the electrical network of an automobile. A pair of secondary rings flank the primary ring and bear coil-wound pole pieces whose inner ends are juxtaposed to the outer surface of the shaft. The coils on the secondary rings are wound in opposing directions and are included in the same electrical circuit.

When the shaft is unloaded, the magnetic field generated by the primary or magnetizing poles is symmetric and lies exactly between the secondary or sensing poles. In this case the magnetic flux through the secondary coils and the current in the sensing circuit are zero.

A torsional loading of the drive shaft results in differential changes in the magnetic permeability. Along the directions of tensile stressing, the magnetic permeability increases, while in the directions of compression, the permeability drops. This alteration of the magnetic permeability of the shaft tilts the direction of the field lines generated by the primary coils, thereby producing a magnetic flux in the secondary pole pieces and through their respective sensing coils. The resulting current or voltage signal in the secondary circuit is a function of the torsional stressing of the drive shaft.

A disadvantage of such an electromagnetic torsion monitor is the large amount of space and energy required in order to achieve measurable magnetic flux densities within linear hysteresis ranges. One reason for the exorbitant energy requirement arises from the heat treatment of the shaft. In addition to increasing the strength of the shaft, heat treatment facilitates the penetration of the shaft by the magnetic field lines and thereby reduces the field density in the region of the sensing coils.

The space and energy requirements render the torsion monitor impractical, uneconomical and unusable in many applications.

OBJECT OF THE INVENTION

The object of our present invention is to provide an improved torsion monitor or sensor of the above described type, which has a reduced energy requirement.

SUMMARY OF THE INVENTION

An assembly for monitoring the torsional loading of a drive shaft comprises, according to our present invention, a cylindrical body of magnetostrictive material having a high magnetic permeability in an unstressed state of the body, this body being rigidly connected to and substantially surrounding the drive shaft. A magnetic-field generator is juxtaposed at least in part with an outer surface of the cylindrical body, while an insulator is provided for inhibiting the penetration of magnetic field lines into the shaft from the body. The insulator preferably includes a cylindrical layer of magnetically nonconductive or insulating material disposed between the magnetostrictive body and the shaft. A pick-up including an electromagnetic sensor is juxtaposed with the body or sheath for detecting distortions in the generated magnetic field to torsional loading of the shaft and for emitting an output signal containing information on the magnitude and the direction of torsional loading of the shaft.

According to another feature of our present invention, the output signal of the sensor includes a high-frequency carrier waveform and a low-frequency modulating waveform having a polarity determined by the direction of loading of the shaft. The monitor further comprises a demodulator operatively connected to the pick-up for extracting the modulating waveform from the carrier waveform.

According to another feature of our present invention, the cylindrical body is formed with a slot, whereby the modulating waveform includes a pulsatile component whose frequency is equal to the rotation rate of the shaft. A high-pass filter is connected to the domodulator for filtering the pulsatile component from the modulating waveform, a low-pass filter being connected to the domodulator for emitting the modulated waveform purged of the pulsatile component.

According to another feature of our present invention, the magnetic-field generator includes a high-frequency oscillator and at least one electromagnetic coil, the oscillator being connected to the coil for energizing the same to generate the magnetic field. The oscillator emits to the coil an a-c signal having a frequency equal to the frequency of the carrier waveform included in the output signal of the sensor. The frequency of the a-c signal and the carrier waveform is advantageously greater than 1 kHz.

According to yet another feature of our present invention, the field generator includes four pole pieces extending radially inwardly toward the shaft from a common ring and carrying respective electromagnetic coils; the pole pieces have pole ends juxtaposed with the magnetostrictive body, each pole end havng an area less than 10 mm$^2$.

Pursuant to another feature of our present invention, the sensor includes a Hall generator. The Hall generator has a core member with a portion oriented at a 45-degree angle with respect to an axis of rotation of the shaft, the electromagnetic coil of the generator at least partially surrounding this skewed core portion. Alternatively, the Hall generator may have a core member with a portion extending parallel to the shaft, while the field generator includes two electromagnetic coils mounted on another core member with a central portion oriented perpendicularly with respect to the shaft.

Pursuant to further alternative features of our present invention, the sensor may include a field plate having a resistance responsive to the magnetic field traversing the plate. In the event that the sensor is a Hall generator, the same may include a permanent magnet.

The cylindrical body sheathing the shaft is advantageously in the form of a metal foil cohesively attached to an outer surface of the shaft. Preferably, the foil hs a thickness less than 0.1 mm.

Alternatively, the magnetostrictive body may take the form of a sleeve attached to the shaft by at least two brackets, the insulator including a space disposed between the sleeve and the shaft. In the case that the shaft is metallic and has a generally nonhomogeneous magnetic permeability, the magnetostrictive body may comprise an outer layer of the shaft which is treated to have a homogeneous permeability, e.g., by heating or by electrolysis.

A torsion monitor according to our present invention requires a relatively small quantity of power to implement an exact measurement of shaft torsion. The relatively thin cylindrical body, together with the magnetically insulating layer, ensures that the magnetic field outside the energizing coils is largely confined to the body, i.e. does not penetrate deeply into the shaft. The resulting increase in the density of the magnetic field in the body facilitates the detection by the electromagnetic pick-up of changes in the direction of the field lines due to differential alterations of the magnetic permeability of the magnetostrictive body in turn caused by a torsional loading of the shaft. The density of the field in the body is further augmented by limiting the thickness of the body and by maintaining the energization frequency greater than 1 kHz.

A monitor according to our present invention is utilizable with plastic shafts and implements torsion measurements with a minimum of required space.

The torsion monitor is advantageously connectable to automatic automobile transmission to effectuate an efficient changing of gear ratios, whereby gasoline economy is promoted.

A monitor according to our invention advantageously combines both torsion and rotation-rate measurement into one device, thereby saving space at the site of application and reducing the total production costs. The simplicity of the design contributes further to the ease and economy of production.

BRIEF DESCRIPTION OF THE DRAWING

These and other features of our present invention will now be described in detail, reference being made to the accompanying drawing in which:

FIG. 1 is a partially schematic side view of a torsion-monitoring assembly according to our present invention, showing energizing coils and sensing coils and including a shaft whose torsional stressing is to be monitored;

FIG. 2 is a cross-sectional view taken along line II—II in FIG. 1;

FIG. 20b is a partially schematic cross-sectional view taken along line XXb—XXb in FIG. 20a;

SPECIFIC DESCRIPTION

Figure 3:
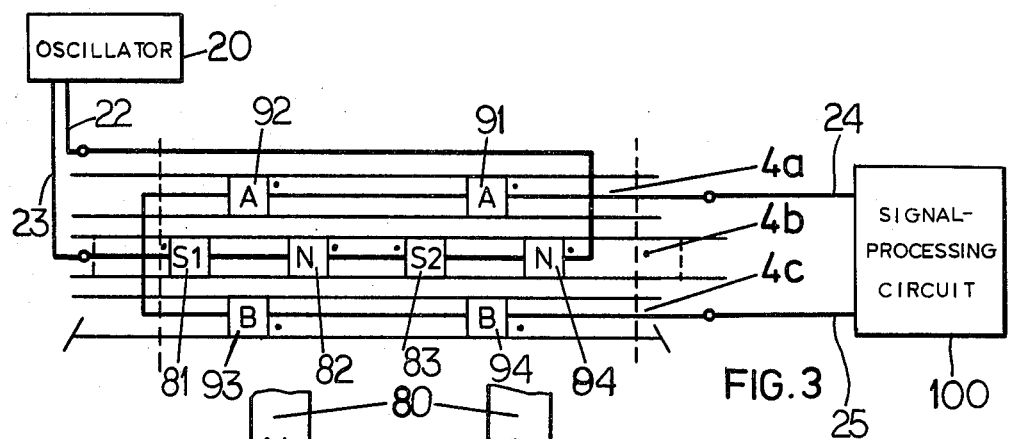
FIG. 3 is a diagram indicating the circuit connections among the coils of FIG. 1.

As illustrated in FIGS. 1 and 2, an assembly 1 for monitoring torsional loading of a drive shaft 2 comprises, according to our present invention, a cylindrical body 11 rigid with an outer surface of the shaft and four electromagnetic energization coils 81, 82, 83, 84 surrounding respective pole pieces 61, 62, 63, 64 extending radially inward from a common carrier ring 4b. This primary ring is flanked by a pair of secondary rings 4a and 4c carrying respective pairs of electromagnetic sensing coils 91, 92 and 93, 94 on radially projecting pole pieces 65, 66, 67, 68.

As shown schematically in FIG. 3, primary or energizing coils 81–84 are tied via leads 22 and 23 to an oscillator 20 which generates a high-frequency a-c signal. Coils 81–84 are connected in series and have alternating winding directions so that pole pieces 61, 63 function as south magnetic poles and pole pieces 62, 64 as north magnetic poles.

Secondary or sensing coils 91-94 are connected in series via leads 24, 25 to a signal-processing circuit 100 described in detail hereinafter with reference to FIGS. 9-12 and 16. Coils 91, 92 have the same winding sense A, while coils 93, 94 have the opposite winding sense B.

Figure 5:
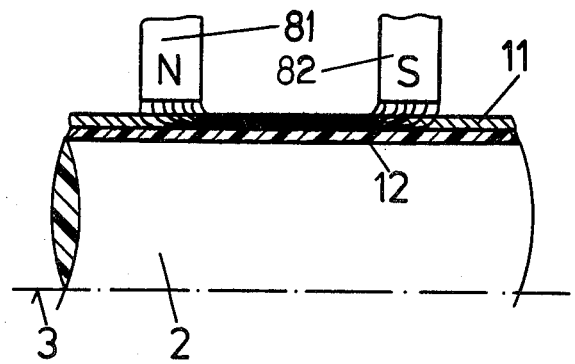
FIG. 5 is a schematic side view, partially in cross-section, of a shaft sheathed with a magnetostrictive coil, according to our present invention indicating the substantial confinement to the foil of a magnetic field generated by coils shown in FIG. 1.

As illustrated in FIG. 5, cylindrical body 11 is preferably in the form of a metal foil having a high magnetic permeability in an unstressed state and is attached to shaft 2 via a layer 12 of magnetically insulating material. Particularly advantageous results are obtained if foil 11 is made of an amorphous metal, because such metals have an extraordinary high permeability (up to 500,000), small coercive field strengths and low magnetization or hysteresis losses.

Layer 12 inhibits the penetration of magnetic flux lines into shaft 2 from foil 11, thereby increasing the magnetic flux density in the foil. This relegation to foil 11 of a magnetic field generated by primary coils 81-84 is further facilitated if the foil has a thickness of less than 0.1 mm and if the a-c output signal of occillator 20 has a frequency greater than 1 kHz. Such a high excitation or energization frequency ensures that the magnetic field generated by the primary coils 81-84 does not establish a significant resonance relationship with the rotation rate of shaft 2.

Figure 6:
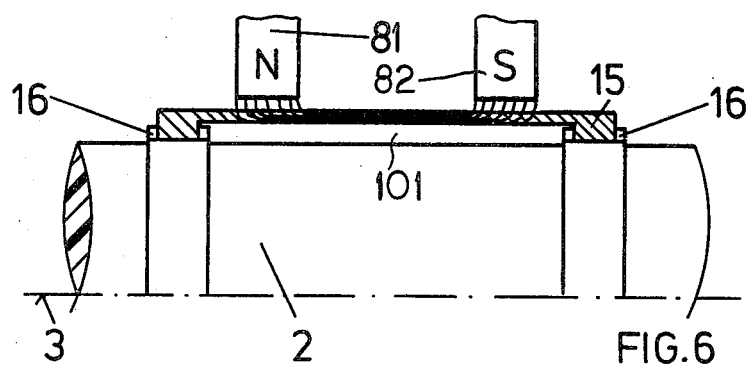
FIG. 6 is a view similar to FIG. 5, showing a cylindrical sleeve instead of a foil.

An alternative embodiment of cylindrical sheath 11 is shown in FIG. 6. A metal sleeve 15 having a high, homogeneous magnetic permeability in an unstressed state is rigidly connected to shaft 2 by a pair of spaced brackets 16. The inner ends of pole pieces 61-64 (see FIGS. 1 and 2) are juxtaposed to an outer surface of sleeve 15 for generating a magnetic field therein in response to the a-c output signal of oscillator 20 (see FIG. 3). An insulation of shaft 2 from magnetic fields generated in sleeve 15 is effectuated by an annular space 101 between the sleeve and the shaft. It is to be noted that sleeve 15 need only extend along a portion of the length of shaft 2.

The utilization of outer foil 11 or sleeve 15 permits shaft 2 to be formed from a metal or an alloy or even from magnetically nonconductive material such as plastics.

Figure 4:
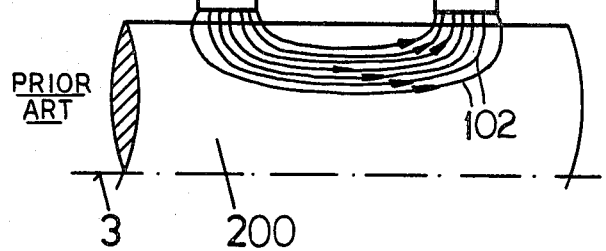
FIG. 4 is a schematic side view of a pair of pole pieces juxtaposed to a metal shaft, showing the penetration of magnetic field lines into the shaft.

As shown in FIG. 4, the magnetic field 102 generated by pole pieces 80 in a shaft 200 of a torsional-stress monitor of conventional design penetrates deeply into the shaft, thereby reducing magnetic flux density at the surface of the shaft. This relatively low magnetic flux density means that a large amount of energy must be used to ensure that the magnetic field is of sufficient strength to enable sensing coils to detect changes in torsional loading.

The cylindrical, magnetically permeable body 11 (FIG. 2) which is a vital part of a torsion-monitoring assembly according to our present invention may alternatively taken the form of a specially treated outer layer of shaft 2. Thus, the core of the shaft may be a metal having a nonhomogeneous magnetic permeability, while the outer layer of the shaft is subjected, for example, to heat treatment or electrolysis to attain a homogeneous magnetic permeability.

Figure 7:
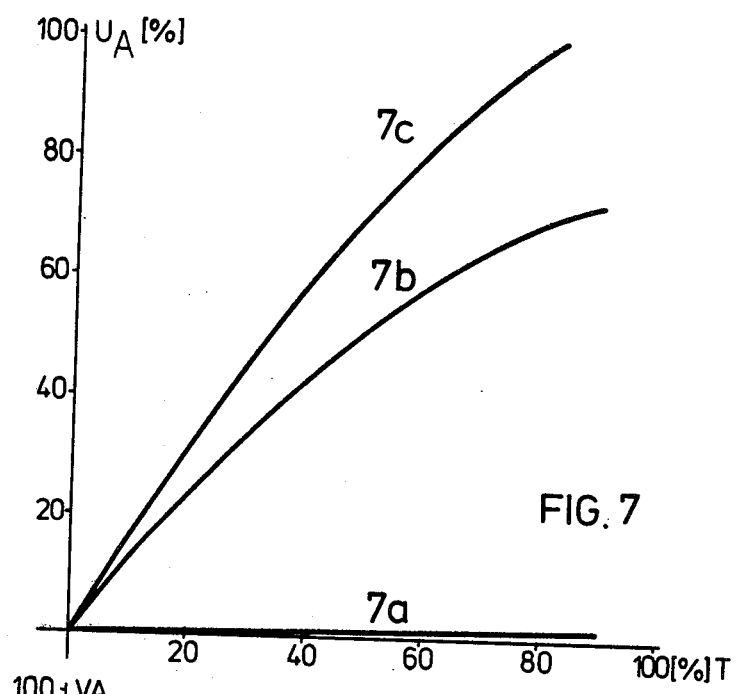
FIG. 7 is a trio of graphs showing the intensity of an output signal of the sensing coils of FIG. 1 for a conventional shaft, a shaft with a homogeneously permeable outer layer and a shaft with a sheath as shown in FIG. 5 or 6.

FIG. 7 shows three graphs 7a, 7b, 7c of the intensity of an output signal $U_A$ emitted over leads 24, 25 by sensing coils 91-94, this intensity varying as a function of increasing torsional loading T. Graph 7a shows results obtained in a conventional monitoring assembly where the drive shaft is made of hardened metal (usually the case in power-transmission applications). If such a hardened shaft is subjected to the above-described permeability-homogenizing treatment, the intensity of output signal $U_A$ as a function of torsional loading of shaft 2 increases, as indicated by graph 7b. Improved results may be obtained (graph 7a) by using a foil 11 attached to shaft 2 by a magnetically insulating layer 12 (FIG. 5) or by using a sleeve 15, as heretofore described with reference to FIG. 6.

Figure 8:
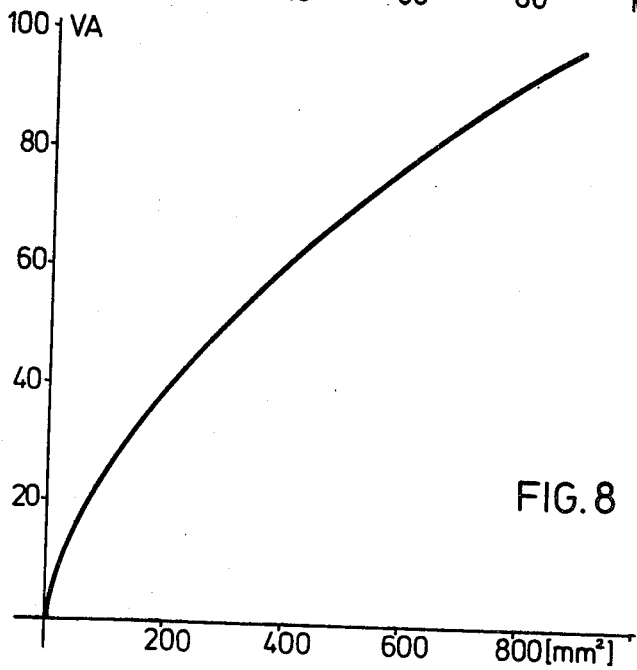
FIG. 8 is a graph of the energy input to the energizing coils of FIG. 1 as a function of pole-pieces area.

In order to further optimize for a given power output of oscillator 20 the intensity of the output signal $U_A$ of the secondary coils 91-94, it is preferable that the energization coils 81-84 do not exceed four and that the inner ends of pole pieces 61-64, i.e. the ends juxtaposed to body 11, each have a surface area less than 10 mm$^2$. Thus, as indicated in FIG. 8, a high magnetic field density (ca. 6 KGs) may be achieved with a minimal oscillator power output, this output possibly remaining less than 100 mW.

Figure 9:
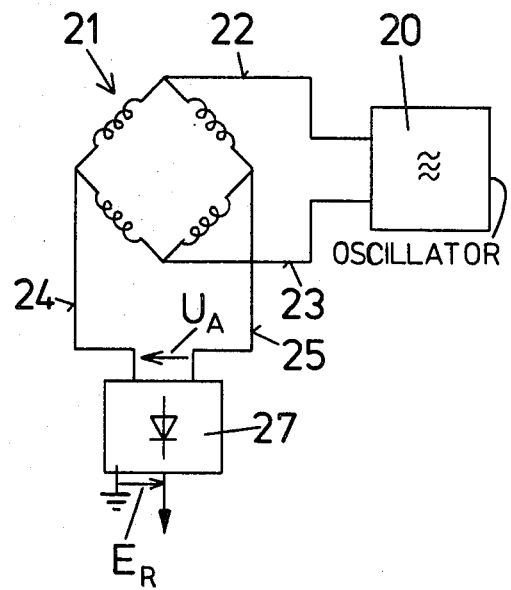
FIG. 9 is a block diagram, similar in part to FIG. 3, showing a rectifier at the output of the sensing coils of FIG. 1.
Figure 11:
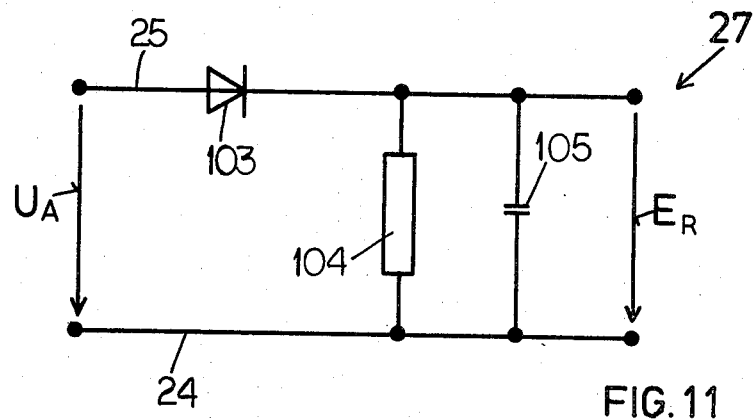
FIG. 11 is a circuit diagram of the rectifier of FIG. 9.

As illustrated in FIG. 9, the secondary or sensing coils 91-94 (FIGS. 1 and 2) of a torsion-monitoring assembly according to our present invention, schematically indicated at 21, may be connected via output leads 24, 25 to a half-wave rectifier 27 illustrated in detail in FIG. 11. Lead 25 is connected to diode 103 in turn connected to lead 24 via a resistor 104 and capacitor 105 parallel thereto, a rectified output signal $E_R$ being present at the taps of the capacitor.

Figure 13:
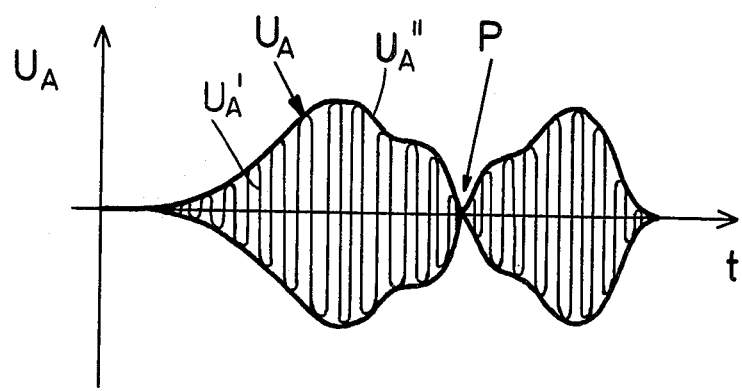
FIG. 13 is a graph of the output signal of the sensing coils of FIG. 1, showing a carrier component modulated by a modulating waveform.

As shown in FIG. 13, output signal $U_A$ of sensing coils 91-94 includes a high-frequency carrier waveform $U_A'$ modulated by a low-frequency modulating waveform $U_A''$. Carrier waveform $U_A'$ is equal in frequency to the a-c output signal of oscillator 20, while modulating waveform has a polarity determined by the direction of torsional loading of shaft 2. The change of polarity of waveform $U_A''$ at point P may indicate, for example, that a motor vehicle having drive shaft 2 has negotiated the top of a hill and is beginning to coast down the downhill side.

Figure 10:
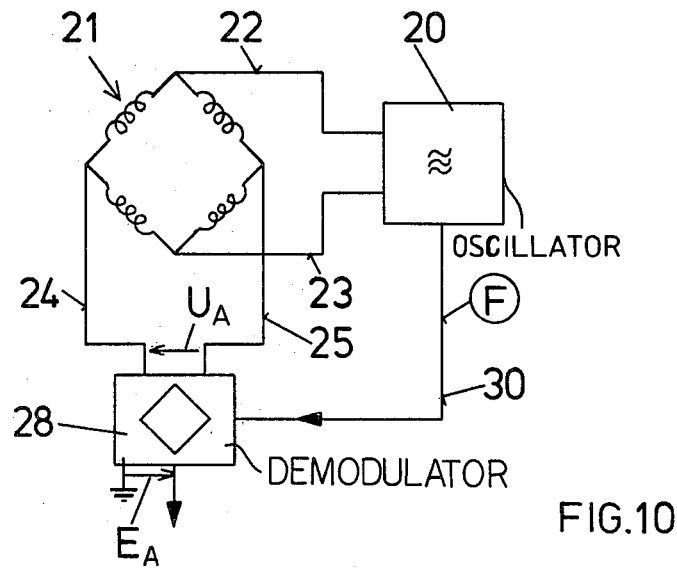
FIG. 10 is a block diagram similar to FIG. 9, showing a demodulator at the output of the sensing coils of FIG. 1.

Rectified signal $E_R$ at the output of rectifier 27 is disadvantageous to the extent that information on directional change in torsional loading of the shaft is lost or at least heavily obscured. This disadvantage is overcome by the utilization of a demodulator 28 at outputs 24, 25, as illustrated in FIG. 10, the demodulator having an input lead 30 extending from oscillator 20 for receiving therefrom an alternating waveform F equal in frequency to the a-c output signal energizing primary coils 81-84 via leads 22, 23.

Figure 12:
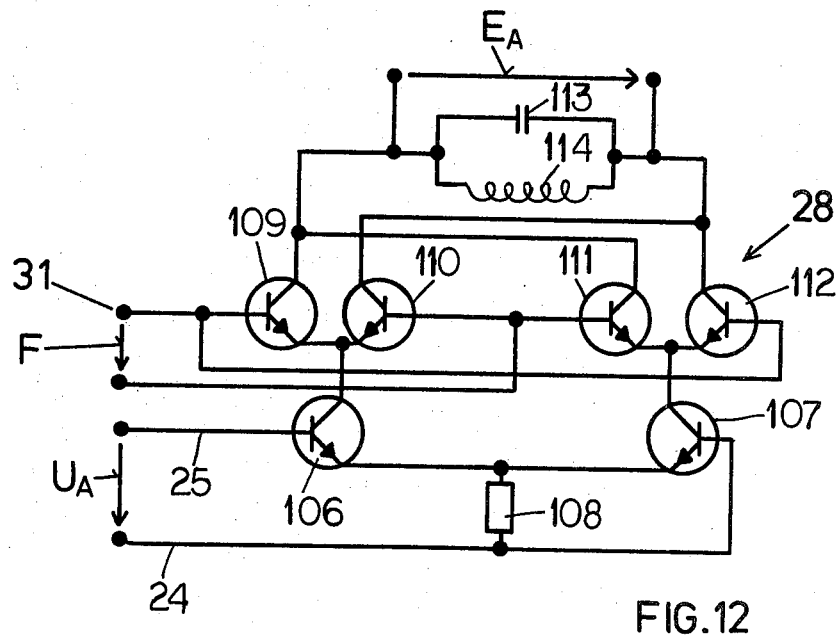
FIG. 12 is a circuit diagram of the demodulator of FIG. 10.
Figure 14:
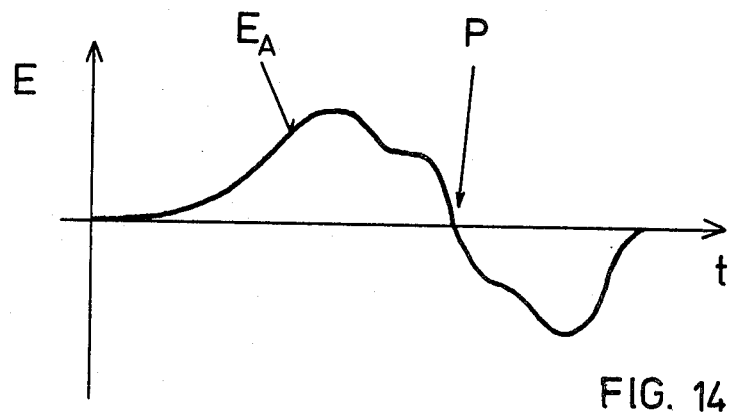
FIG. 14 is a graph of the modulating waveform of FIG. 13.

As shown in detail in FIG. 12, demodulator 28 comprises a first pair of transistors 106, 107 having bases connected to leads 24, 25, respectively, and emitters tied directly to one another and to lead 24 via a resistor 108. The collectors of transistors 106, 107 have the same potential levels as the emitters of two further pairs of transistors 109, 110 and 111, 112, respectively. Transistors 109, 112 have bases linked to one contact and transistors 110, 111 have bases tied to another contact of a terminal 31 connected to oscillator 20 via lead 30 for receiving waveform F. The collectors of transistors 109, 111 are connected to one end of a resonance circuit consisting of a capacitor 113 and an inductor 114 in parallel to one another, the collectors of transistors 110 and 112 being tied to the other end of resonance circuit 113, 114. Demodulator 28 has an output voltage $E_A$ appearing across resonance circuit 113, 114, this output voltage being substantially the same as modulating waveform $U_A''$ (see FIG. 13). This waveform contains information on the magnitude and direction of torsional loading of shaft 2 and is shown in the graph of FIG. 14.

It is to be noted that the material of foil 11 or sleeve 15 or the treated outer surface of shaft 2 is magnetostrictive. The magnitude of the magnetic permeability depends on the direction and magnitude of internal stressing. Compression decreases, while tension increases, the permeability. In the absence of power transmission over shaft 2, i.e. in the absence of torsional loading, the magnetic field lines of the fields generated by the primary coils 81-84 lie in circular arcs which in turn lie in a plane parallel to rings 4a-4c. This plane is perpendicular to secondary pole pieces 65-68 and, consequently, sensing coils 91-94 emit no output signal. Upon the torsional loading of shaft 2, the tangential magnetic permeability of foil 11 (or sleeve 15 or the treated outer surface of the shaft) i.e. the permeability measured tangentially to shaft 2, increases in one direction oriented at a 45-degree angle with respect to a rotation axis 3 (see FIGS. 1 and 2) of shaft 2 and decreases in a second direction which is orthogonal to the first direction. This differential change in permeability is due to tensile stressing of foil 11 in the first direction and compressive stressing in the second direction and enables magnetic fields generated by the primary coils 81-84 to traverse the secondary pole pieces 65-68 and thereby energize the sensing coils 91-94 to emit output signal $U_A$ (FIG. 13). The greater the torsional loading of the drive shaft, the greater the intensity of the magnetic field in the direction of tensile stressing, i.e. at a 45-degree angle with respect to rotation axis 3, and the less the intensity along the circular arcs extending between the respective pairs of energizing coils 81, 82 and 83, 84.

Figure 15:
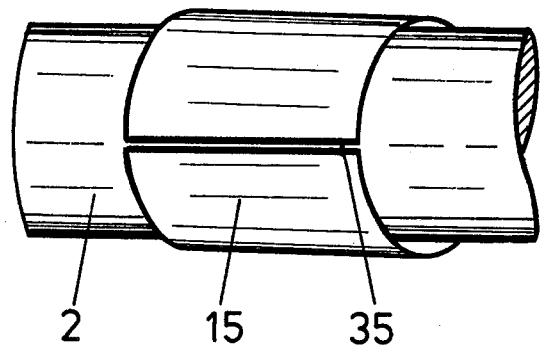
FIG. 15 is a partially diagrammatic perspective view of the sleeve of FIG. 6 with a longitudinal slot.
Figure 16:
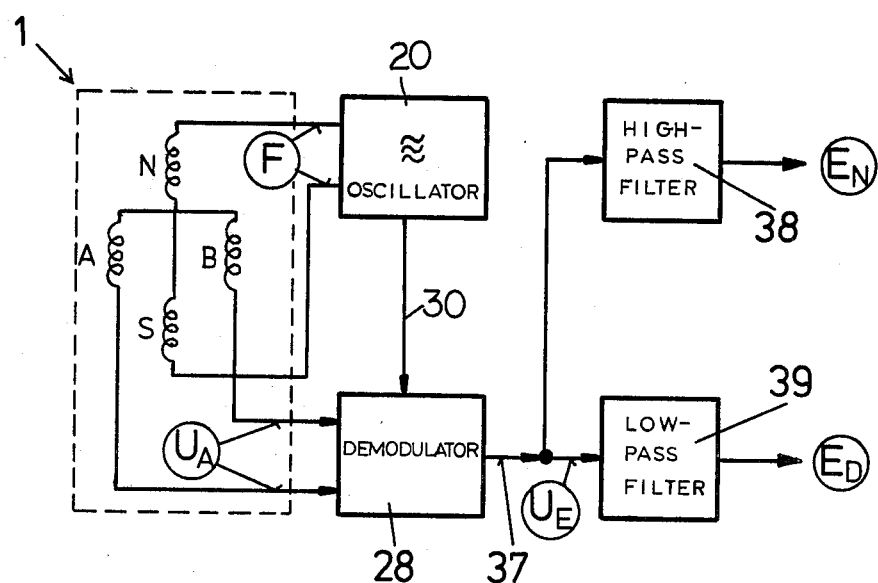
FIG. 16 is a block diagram similar to FIG. 10, showing a low-pass filter and a high-pass filter at the output of the demodulator of FIG. 10.
Figure 17A:
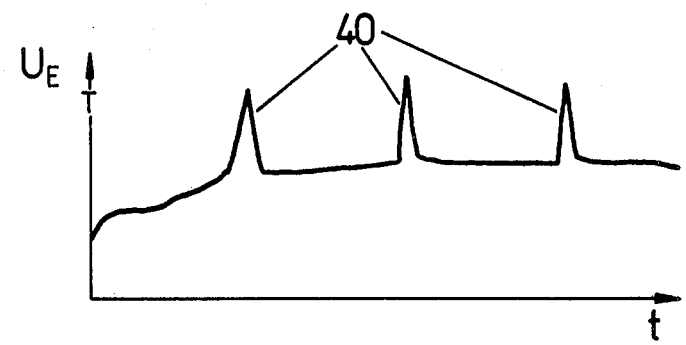
FIG. 17a is a graph of a signal emitted by the demodulator of FIG. 16 and having a low-frequency component related to torsional loading of the shaft of FIG. 15 and a high-frequency component related to the rotation rate of the shaft of FIG. 15.
Figure 17B:
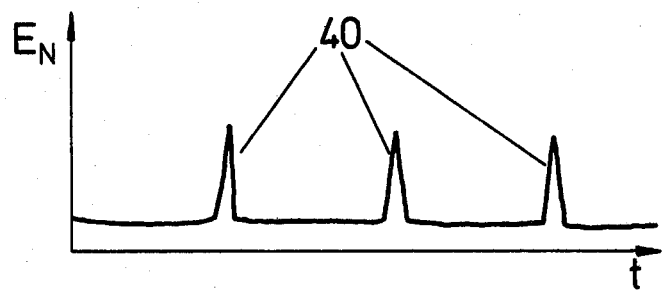
FIG. 17b is a graph of the high-frequency component shown in FIG. 17a, produced at the output of the high-pass filter of FIG. 16.
Figure 17C:
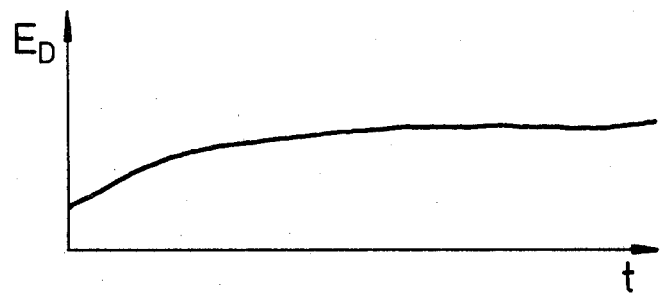
FIG. 17c is a graph of the low-frequency component shown in FIG. 17a, produced at the output of the low-pass filter of FIG. 16.

In order to enable a tension monitor according to our present invention to also detect the revolution speed or rotation rate of shaft 2, sleeve 15 (or foil 11) is provided with a longitudinal slot 35, as shown in FIG. 15. As illustrated in FIG. 16, demodulator 28 is connected via a branching output lead 37 to a high-pass filter 38 and a low-pass filter 39. A demodulated signal $U_E$ emitted on lead 37 includes a pulsatile component 40 (see FIG. 17a) equal in frequency to the rotation rate of shaft 2, this pulsatile component being filtered from demodulated signal $U_E$ and generated as an output pulse train $E_N$ (see FIG. 17b) by high-pass filter 38. Low-pass filter 39 purges demodulated signal $U_E$ of the relatively high-frequency pulsatile component 40 and emits an output waveform $E_D$ (FIG. 17c) whose polarity changes signify reversals in shaft torsion and whose magnitude is a function of the torque exerted on shaft 2. Signals $E_D$ and $E_A$ may be fed to display indicators for utilization by a motor-vehicle operator in determining optimal times for changing transmission gear ratios.

It is to be noted that slot 35 may be formed as a recess in the surface of shaft 2 in the event that body 11 is formed as a specially treated outer layer of the shaft.

Figures 18, 19:
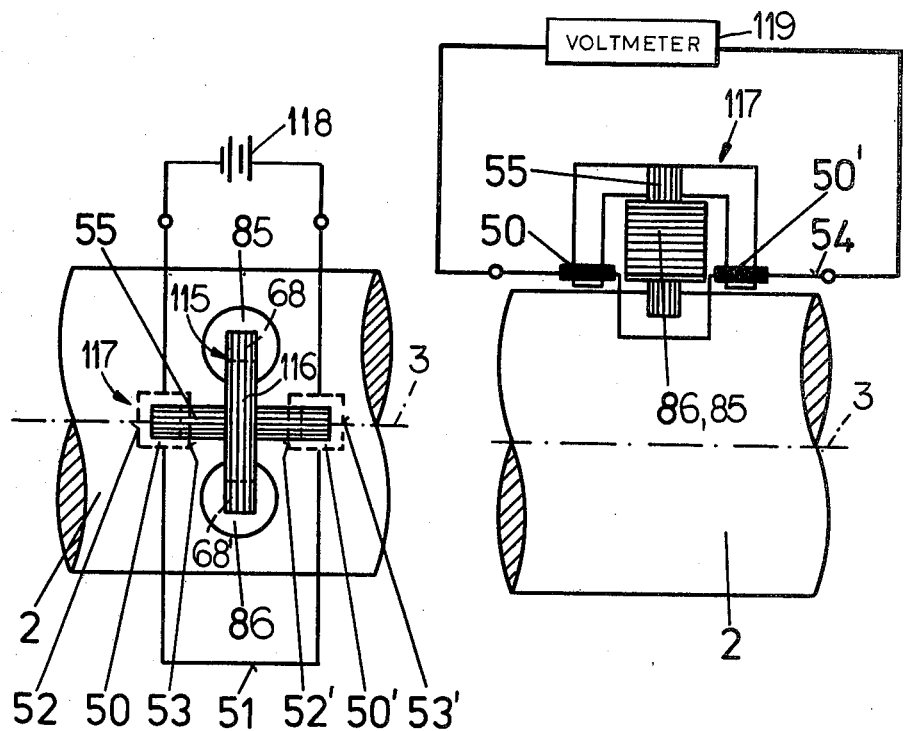
FIG. 18 is a partially schematic top view of another torsion-monitoring assembly according to our present invention.
FIG. 19 is a partially schematic side view of the assembly of FIG. 18.

As illustrated in FIGS. 18, 19, a torsion monitor according to our present invention may alternatively comprise a pair of electromagnetic energizing coils 85, 86 mounted on pole pieces 68, 68' formed as end portions of a metallic core member 115 having a central portion 116 lying in a plane extending transversely to shaft rotation axis 3. As heretofore described with reference to FIG. 3, coils 85 and 86 are connected to oscillator 20 and having opposite winding senses. A sensor in the form of a Hall generator 117 for detecting changes in magnetic conductivity of the magnetostrictive body 11 (or 15) surrounding shaft 2 includes a core member 55 extending parallel to axis 3 and perpendicularly to core portion 116, member 55 carrying at opposite ends a pair of plates 50, 50' juxtaposed to magnetostrictive outer layer or body 11 (or 15). Hall generator 117 is provided with a first lead 51 which connects a source of d-c current 118 to plates 50, 50' and a second lead 54 which is linked to faces 52, 53 and 52', 53' of plates 50 and 50' and to a voltage monitor 119 for detecting potential build-ups in plates 50, 50' due to a magnetic field induced in core member 55.

In the absence of torsional loading of shaft 2, primary coils 85 and 86 generate an oscillating magnetic field with field lines forming a loop through core member 115 and along a circular arc in the magnetic sheath 11 or 15 at least partially surrounding the shaft. The voltage or potential difference detected by monitor 119 is zero, the current density vectors in plates 50, 50' being parallel to the electric field vectors. Upon a torsional loading of shaft 2, magnetic field lines produced by the energizing coils 85, 86 extend in part along ellipsoidal arcs in body 11 (or 15) and through core member 55, whereby potential differences arise in plates 50 and 50' between faces 52, 53 and 52', 53', these potential differences being detected by the voltage monitor 119. As heretofore described with reference to FIGS. 10, 12, 13, 14, lead 54 may be connected to demodulator 28 for extracting modulating waveform $U_A''$ from carrier waveform $U_A'''$.

Figure 20A:
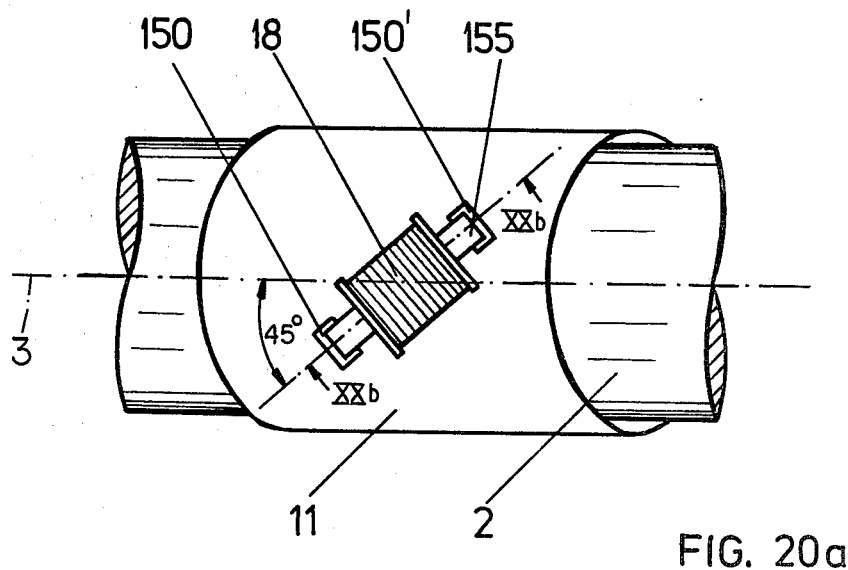
FIG. 20a is a partially schematic top view of yet another torsion-monitoring assembly according to our present invention, showing an energizing coil and Hall generator plates.
Figure 20B:
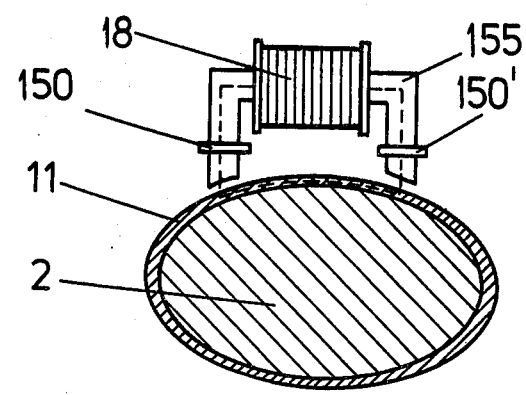
Figure 20C:
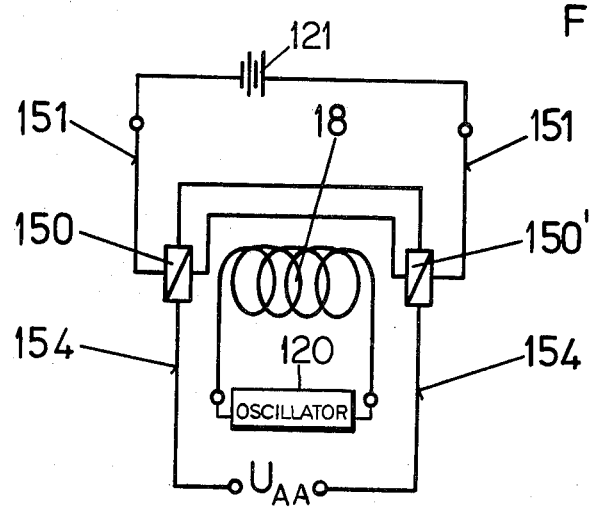
FIG. 20c is a diagram of the circuit feeding the energizing coil and Hall generator plates of FIGS. 20a and 20b.

As illustrated in FIGS. 20a-20c, an alternative embodiment of the field-generating and sensing portions of a torsion monitor according to our present invention comprises a single core member 155 oriented at a 45-degree angle with respect to rotation axis 3 and a single energizing coil 18 mounted on a central part of this core member, opposite ends of the core member carrying Hall plates 150, 150'. As shown schematically in FIG. 20c, plates 150, 150' are connected in series to a d-c current source 121 via a lead 151. Another lead 154 is connected to the plates for monitoring the Hall-effect voltage $U_{AA}$ produced therein.

In the absence of torsional loading of shaft 2, coil 18 generates, in response to an a-c signal from a high-frequency oscillator 120, a magnetic field having flux lines extending in a loop through core member 155 and along an ellipsoidal arc in magnetostrictive sheath 11. Upon torsional loading of the shaft, the magnetic flux increases or decreases in intensity, depending on the direction of the torsional loading. Output signal $U_{AA}$ may be processed to extract information on the magnitude and direction of the torque exerted on shaft 2.

Figure 21:
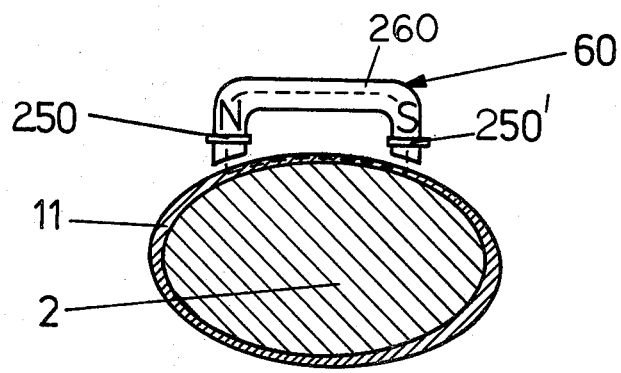
FIG. 21 is a cross-sectional view, similar to FIG. 20b, of yet another torsion-monitoring assembly according to our present invention.

As shown in FIG. 21, energizing and sensing portions of a torsion monitor according to our present invention may be combined in the form of a permanent magnet 60 carrying Hall generator plates 250 and 250' and having a central portion 260 extending at a 45-degree angle with respect to the rotation axis of drive shaft 2. As described above with reference to FIG. 20c, the Hall generator plates may be connected to a processing circuit for extracting information on the direction and magnitude of torsional loading.

Hall generator plates 50, 50', 150, 150', 250, 250' may be replaced by field plates whose resistance varies as a function of the magnetic field penetrating the plates. The changing resistance may then be detected and processed to determine the stressing of shaft 2.

We claim:
1. An assembly for monitoring torsional loading of a drive shaft, said assembly comprising:

a cylindrical body of magnetostrictive material having a high magnetic permeability in an unstressed state of said body, said body being rigid with and substantially surrounding said shaft;

induction means juxtaposed at least in part with an outer surface of said body for generating a magnetic field therein;

insulating means for inhibiting the penetration of magnetic flux lines into said shaft from said body;

pick-up means including an electromagnetic sensor juxtaposed with said body for detecting distortions in said magnetic field due to torsional loading of said shaft and for generating an output signal containing information on the magnitude and direction of torsional loading of said shaft, said output signal including a high-frequency carrier waveform and a low-frequency modulating wveform having a polarity determined by the direction of loading of said shaft; and a demodulator operatively connected to said pick-up means for extracting said modulating waveform from said carrier waveform, said body being formed with a slot, whereby said modulating waveform includes a pulsatile component whose frequency is equal to the rotation rate of said shaft.

2. The assembly defined in claim 1, further comprising a high-pass filter operativey connected to said demodulator for filtering said pulsatile component from said modulating waveform, further comprising a low-pass filter operatively connected to said demodulator for emitting said modulating waveform purged of said pulsatile component.

3. The assembly defined in claim 2 wherein said induction means includes a high-frequency oscillator and at least one electromagnetic coil, said oscillator being operatively connected to said coil for energizing same to generate said magnetic field, said oscillator emitting to said coil an a-c signal having a frequency equal to the frequency of said carrier waveform.

4. The assembly defined in claim 3 wherein said a-c signal and said carrier waveform have a frequency greater than 1 kHz.

5. The assembly defined in claim 4 wherein said induction means includes four pole pieces extending radially inwardly toward said shaft from a common ring and carrying respective electromagnetic coils, said pole pieces having pole ends juxtaposed to said body and each having an area less than 10 mm$^2$.

6. The assembly defined in claim 4 wherein said sensor includes a Hall generator.

7. The assembly defined in claim 6 wherein said Hall generator includes a core member having a portion oriented at a 45-degree angle with respect to an axis of rotation of said shaft, said coil at least partially surrounding said portion.

8. The assembly defined in claim 6 wherein said Hall generator includes a core member having a portion extending parallel to said shaft, said induction means including two electromagnetic coils mounted on a core member having a portion oriented perpendicularly with respect to said shaft.

9. The assembly defined in claim 4 wherein said sensor means includes a field plate having a resistance responsive to said magnetic field.

10. The assembly defined in claim 1 wherein said sensor includes a Hall generator provided with a permanent magnet.

11. The assembly defined in claim 1, 2, 3, 4, 5, 6, 7, 8 or 9 wherein said body comprises a metal foil cohesively attached to an outer surface of said shaft with interposition of a layer forming said insulating means.

12. The assembly defined in claim 11 wherein said foil has a thickness of less than 0.1 mm.

13. The assembly defined in claim 1, 2, 3, 4, 5, 6, 7, 8, or 9 wherein said body comprises a metal sleeve attached to said shaft by means of at least two brackets, said insulating means including a space between said sleeve and said shaft.

14. The assembly defined in claim 1, 2, 3, 4, 5, 6, 7, 8 or 9 wherein said shaft is metallic and has a generally nonhomogeneous magnetic permeability, said body comprising an outer layer of said shaft which is treated to have a homogeneous magnetic permeability and adjacent a region forming said insulating means.

* * * * *